US006847972B1

(12) United States Patent
Vernau et al.

(10) Patent No.: US 6,847,972 B1
(45) Date of Patent: Jan. 25, 2005

(54) APPARATUS FOR CLASSIFYING OR DISAMBIGUATING DATA

(75) Inventors: Judi Vernau, London (GB); David Crystal, Anglesey (GB)

(73) Assignee: Crystal Reference Systems Limited, Anglesey (GB)

(*) Notice: Subject to any disclaimer, the term of this patent is extended or adjusted under 35 U.S.C. 154(b) by 0 days.

(21) Appl. No.: 09/412,754

(22) Filed: Oct. 5, 1999

(30) Foreign Application Priority Data

Oct. 6, 1998 (GB) .............................................. 9821787

(51) Int. Cl.[7] .............................................. G06F 17/30
(52) U.S. Cl. .............................. 707/101; 707/1; 707/4; 707/5; 707/6; 707/102; 707/100; 707/104
(58) Field of Search ........................... 707/1, 5, 6, 100, 707/101, 4, 102, 104, 514; 705/14

(56) References Cited

U.S. PATENT DOCUMENTS

| | | | | |
|---|---|---|---|---|
| 5,768,580 A | * | 6/1998 | Wical | 707/102 |
| 5,835,905 A | * | 11/1998 | Pirolli et al. | 707/3 |
| 5,873,056 A | | 2/1999 | Liddy et al. | 704/9 |
| 5,930,788 A | * | 7/1999 | Wical | 707/5 |
| 5,983,246 A | * | 11/1999 | Takano | 707/514 |
| 5,991,709 A | * | 11/1999 | Schoen | 704/1 |
| 6,038,560 A | * | 3/2000 | Wical | 707/5 |
| 6,041,329 A | * | 3/2000 | Kishi | 707/100 |
| 6,052,693 A | * | 4/2000 | Smith et al. | 707/104.1 |
| 6,088,692 A | * | 7/2000 | Driscoll | 707/5 |
| 6,233,575 B1 | * | 5/2001 | Agrawal et al. | 707/6 |
| 6,240,410 B1 | * | 5/2001 | Wical | 707/4 |
| 6,253,188 B1 | * | 6/2001 | Witek et al. | 705/14 |
| 6,263,335 B1 | * | 7/2001 | Paik et al. | 707/5 |

FOREIGN PATENT DOCUMENTS

| | | |
|---|---|---|
| GB | 2 329 488 | 3/1999 |
| GB | 2 336 698 | 10/1999 |
| WO | WO 95/12173 | 5/1995 |
| WO | WO 97/10557 | 3/1997 |
| WO | WO 98/58344 | 12/1998 |
| WO | WO 99/56223 | 11/1999 |

OTHER PUBLICATIONS

Elizabeth D. Liddy, et al., Proceedings of AAAI Fall 1992 Symposium on Probabilistic Approach to Natural Language Processing, pp. 98–107, "Statistically–Guided Word Sense Disambiguation", Oct. 22–24, 1992.
Elizabeth D. Liddy, et al., Advances in Classification Research, vol. III, pp. 83–100, "Use of Subject Field Codes from a Machine–Readable Dictionary for Automatic Classification of Documents", Oct. 25, 1992.
Elizabeth D. Liddy, et al., The First Text Retrieval Conference (TREC–1), NIST Special Publication 500–207, pp. 113–129, "Dr–Link's Linguistic–Conceptual Approach to Document Detection", Mar. 1993.
Elizabeth D. Liddy, et al., Proceedings Human Language Technology Workshop, pp. 358–362, "An Overview of Dr–Link and its Approach to Document Filtering", Mar. 21–24, 1993.

* cited by examiner

Primary Examiner—Thuy N. Pardo
(74) Attorney, Agent, or Firm—Oblon, Spivak, McClelland, Maier & Neustadt, P.C.

(57) ABSTRACT

A computing system has a data storage device for storing a database including a classified vocabulary of terms. A processor of the apparatus is arranged to associate each term with a number of different categories of data and to associate all terms falling within the same category with a common code identifying a collocation of terms that exemplify that category so that terms in different categories are associated with different codes and can be disambiguated. The processor is arranged to write, directly or indirectly, a classified vocabulary including the terms together with the associated code onto a computer-readable storage medium or to supply an electrical signal via, for example a MODEM or a LAN/WAN. The database may be used in classification of documents, spelling checking of documents and refining of keyword search results.

33 Claims, 9 Drawing Sheets

| | |
|---|---|
| TERM | |
| DESCRIPTION | |
| DEFINITION | |
| CAT ID | |
| PART OF SPEECH | |
| INFLECTED FORMS | |
| ABBREVIATIONS AND DERIVATIVES | |

FIG. 3A

| | |
|---|---|
| CAT ID | |
| CLASSIFICATION CODE | |
| CHARACTERIZATION | |
| COLLOCATION | |

FIG. 3B

ROADS

Automobile Association, a British organization which helps drivers with breakdowns or technical problems, gives road travel information, etc.

SELECT DOMAIN

RETURN

FIG. 8

WEAPONS anti-aircraft, a gun or missile designed for use against enemy aircraft

SELECT DOMAIN

RETURN

FIG. 9

APPARATUS FOR CLASSIFYING OR DISAMBIGUATING DATA

This invention relates to apparatus for classifying or processing data. In particular this invention is concerned with apparatus for enabling use, storage, disambiguating or manipulating of an item of data in accordance with a category, for example a subject matter area, within which that item of data is determined to fall.

Classification schemes are used to enable items of data in a particular category to be retrieved either from a physical location or electronically. Various different specific classification schemes exist. Thus, for example, the Dewey Decimal, Universal Decimal and Library of Congress classification schemes are all used to classify library material to enable librarians and other people using a library to identify the location of books and other publications by title, by author or by subject matter. In addition, international standard industry codes exist to classify commercial products and the Whittacker system classifies living organisms. Each of these existing classification schemes is thus particular to a certain type of subject matter and, moreover, requires that each individual item of data such as a book or publication be manually classified to enable its subsequent retrieval using the classification scheme.

Since such manual classification is a time-consuming and costly activity, several attempts have been made to devise a means of automatically classifying documents, primarily by comparing words in the document with words known to occur frequently in particular subject areas. Such an approach is described in WO97/10557. Where the words in the document include sufficient of the frequently-occurring subject words, the document is determined to be about that subject. A drawback to this approach is that when a large number of subject areas are involved, the speed of comparison may be slow. It is also the case that, since this approach is based on word frequencies, a document which contains unusual words may be classified incorrectly.

The Internet provides, via the world wide web, access to a large amount of data. A number of search engines are available via the world wide web to enable retrievals of documents containing text on a specific topic. To retrieve documents relating to a specific topic, a keyword (which may consist of one or more terms) is entered and the search engine then searches for documents available electronically via the world wide web and containing that keyword. The results of the search are then collated and the titles displayed to the user who can then access the individual documents. However, such search engines are extremely inefficient frequently returning very large numbers of 'hits' or documents which are not directly related to the search because, in many cases, it is not possible to identify precisely the field of enquiry simply by means of a keyword. For example, if the keyword is 'depression', documents relating to each of the meteorological, economic and medical meanings of the term 'depression' will be retrieved. Some search engines seek to improve results by offering additional keywords for selection by the user in order to expand the search term. Such keywords are generally based on frequency counts and may therefore exclude the required subject area if this is less common.

It is an aim of the present invention to provide an apparatus for classifying terms in a manner which can be universal and which enables more efficient and accurate identification and extraction of terms relating to a specific desired topic or subject matter area, so enabling disambiguation.

In one aspect, the present invention provides apparatus for storing data on a computer readable storage medium having means for associating all terms falling within a common category with a common code identifying a collocation associated with that category and means for directly or indirectly writing each term together with the associated code onto a computer readable storage medium. The writing means may be arranged also to write the collocation for the associated code onto the computer readable storage medium. The writing means may be replaced or supplemented by signal generating means for generating a signal carrying each term together with the associated code and optionally also the associated collocation.

The categories may comprise different subject matter areas which are desirably sufficient to encompass all data currently available in the world. Typically, the subject matter areas may be the universe, the earth, the environment, natural history, humanity, recreation, society, the mind, human history and human geography. Each of these subject matter areas may be divided into smaller subject matter areas which may themselves in turn be divided into even smaller subject matter areas. Desirably, each category comprises a combination of a subject matter area and a species or genus with each item of data being allocated to only one species or genus. Typically, there may be five species or genus which may consist of, for example, people, places, organizations, products and terminology with the latter genus including general concepts within the subject matter area. The classification of terms into both subject matter areas and genera enables efficient and accurate retrieval of terms in a context specific manner and enables a distinction to be made between the use of the same term as the name of the person, the name of a place and the name of an organization, for example.

In one aspect, the present invention provides apparatus for storing data on a computer readable storage medium, comprising:
  means for storing terms;
  means for associating each term with one of a number of different subject matter areas;
  means for associating each term with one of a number of different species areas such that each item of data is associated with one or more subject matter areas but only with one species area; and
  means for directly or indirectly writing each term onto a computer readable storage medium in association with a code or codes identifying the associated subject matter and species areas.

The writing means may be replaced or supplemented by means for generating a signal carrying the same data as is written onto the computer readable storage medium.

In one aspect, the present invention provides apparatus for processing data by determining which of a number of collocations each associated with a specific different category is relevant to a received term.

In one aspect, the present invention provides apparatus for checking the spelling of terms in a text which comprises means for determining a category relevant to the text and means for highlighting or otherwise identifying to a user terms which may have been incorrectly used. Such apparatus may desirably comprise: means storing a vocabulary and means for comparing the terms used in the text with the terms in the vocabulary to identify any terms in the text not present in the vocabulary; means for determining, when unknown terms are identified in the text, likely possible alternative terms in the vocabulary that have the same category and means for advising a user of the possible alternative term or terms. Such apparatus may be used as part of a word processing arrangement to check the spelling of terms or words in a text document. Such apparatus may also be used to check, where the spelling is correct, that none of the terms used in the text being checked are inappropriate for the determined category of the document.

In one aspect, the present invention provides apparatus for classifying a text which comprises means for comparing terms used in the text with the terms used in a classified vocabulary in which classified terms are associated with categories and means for allocating a classification code to the text in accordance with the results of the comparison. The text to be classified may be supplied in a computer readable form or may be optically scanned and then converted into a computer readable form using known optical character recognition software. Such apparatus enables text to be classified automatically without the need for a person skilled in the subject matter area of the text or in document classification to study the text to determine the subject matter area to which the text relates.

In one aspect, the present invention provides apparatus for refining the results of a subject matter search carried out by a search engine using a keyword, for example an Internet search engine, the apparatus comprising:

means for accessing a plurality of collocations, each collocation being associated with a respective different one of a number of categories;

means for determining whether the keyword falls in one or more of the different categories and, if the keyword used falls within a number of different categories, advising a user of these different categories;

user operable selection means for selecting one of the determined categories;

means for comparing the terms used in each text located by the search with the terms in the collocation associated with the selected category; and means for filtering the search results in accordance with the number of terms the search result texts have in common with the collocation associated with the selected category.

The present invention also provides a computer usable storage medium carrying processor implementable instructions for causing operation of apparatus according to any of the aspects referred to above.

The present invention also provides a computer readable storage medium or signal carrying the results of operation of apparatus in accordance with any one of the aspects referred to above.

Embodiments of the present invention will now be described, by way of example, with reference to the accompanying drawings, in which:

FIG. 3A shows the structure of an item of data in a classified vocabulary;

FIG. 3B shows the structure of an item from a classification scheme data set;

FIGS. 5 to 9 show diagrammatically the image displayed on a display of the apparatus shown in FIG. 1 at various stages in a method embodying the invention for refining the results of a search;

For ease of understanding definitions of several of the terms or phrases used herein will now be given.

As used herein the phrase "item of data" means an entry in the classified vocabulary that includes a term, its description and at least one of a corresponding category identification and a classification code.

As used herein the word "term" means a term which may consist of one or more words (including made up words, proper nouns, etc.) or abbreviations and which may have one or more different meanings but which, for a given meaning, conveys a single concept. It will be understood that a single term may have more than one meaning. Thus, for example, the term "depression" has a number of meanings including a meteorological, a medical and an economic meaning.

As used herein "classification scheme" means the set of subject matter areas or domains and associated genera used to classify terms.

As used herein "category" means a specific combination of the subject area and genus in which a term is classified.

As used herein "classification code" means the code allocated to a term and which identifies the category within which the term falls.

As used herein "category identification" means a code unique to a classification code and a particular collocation.

As used herein "classified vocabulary" means a set of terms classified in accordance with the classification scheme.

As used herein "classification data set" means a set of items each consisting of a collocation, a characterisation or description of that collocation and at least one of the corresponding category identification and classification code.

As used herein "collocation" means a collection of terms (not necessarily organized in any specific order) that exemplify a category of data and which would frequently be found in documents that should fall within that category.

As used herein "keyword" means a search term (which may be made up of one or more words and/or abbreviations) entered by a user.

Figure 1:
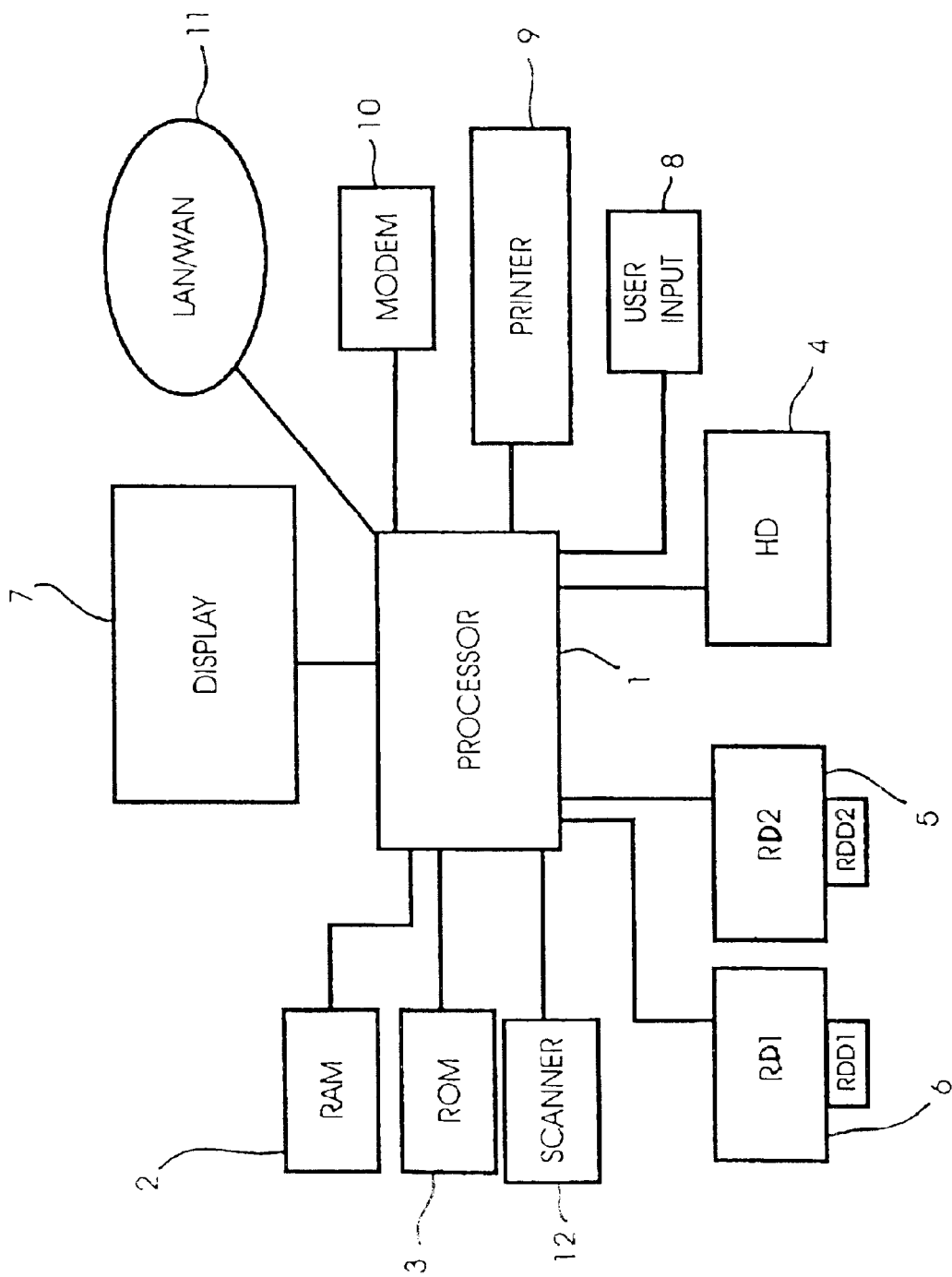
FIG. 1 shows a block diagram for illustrating the architecture of a computer apparatus for use in the present invention.

FIG. 1 shows a computing system which is constructed of conventional components. In this example, the computing system comprises a conventional personal, for example desktop, computer and associated peripherals. The computing system could, however, also be a mobile computing system such as a lap-top with appropriate peripherals or an in-car system or a larger system such as a minicomputer or mainframe depending upon the user's requirements. FIG. 1 shows a functional block diagram of the main elements of the computing system necessary for understanding the present invention. It will, of course, be appreciated that the computing system will have all the necessary interfaces, buses etc. for enabling correct operation of the computing system.

As shown in FIG. 1, the computing system has a processor 1 for carrying out processor implementable instructions, a random access memory (RAM) 2 for storing data and other instructions used by the processor 1, a read-only memory (ROM) 3, a hard disk drive (HD) 4 also for storing instructions and data usable by the processor 1 and, in this example, two storage devices (RD1 and RD2) 5 and 6 having removable data storage media or disks (RDD1 and RDD2) which are shown partly inserted into their respective drives in FIG. 1. As an example, one of the data storage devices 5 and 6 may be a read-only device such as a CD ROM drive with the removable data storage disk RDD1 providing data and/or processor implementable instructions to be read by the processor 1 while the other data storage device may be capable of both reading to and writing from the removable disk RDD2 and may be, for example, a floppy disk drive, a writable or many times writable CD or other optical or magnetooptical disk drive or a ZIP (Trade Mark) or SPARQ (Trade Mark) magnetic storage type device.

As shown in FIG. 1, the computing system also has a display 7 such as a cathode ray tube or liquid crystal display, a user input device or devices 8 which may comprise both a pointing device such as a mouse and a keyboard, a printer 9, a MODEM 10 for enabling connection to, for example, the Internet and possibly also a local area or wide area network (LAN/WAN) connection 11 for coupling the computing system in a network with other similar computing systems. The computing system may also have a scanner 12 which, together with conventional optical character recognition software stored in, for example, the hard disk drive 4, enables the computing system to convert paper text documents into electronic text documents. The user input device(s) 8 may also include a microphone and the computing system may have speech recognition software for enabling vocal input of data or instructions.

Figure 2:
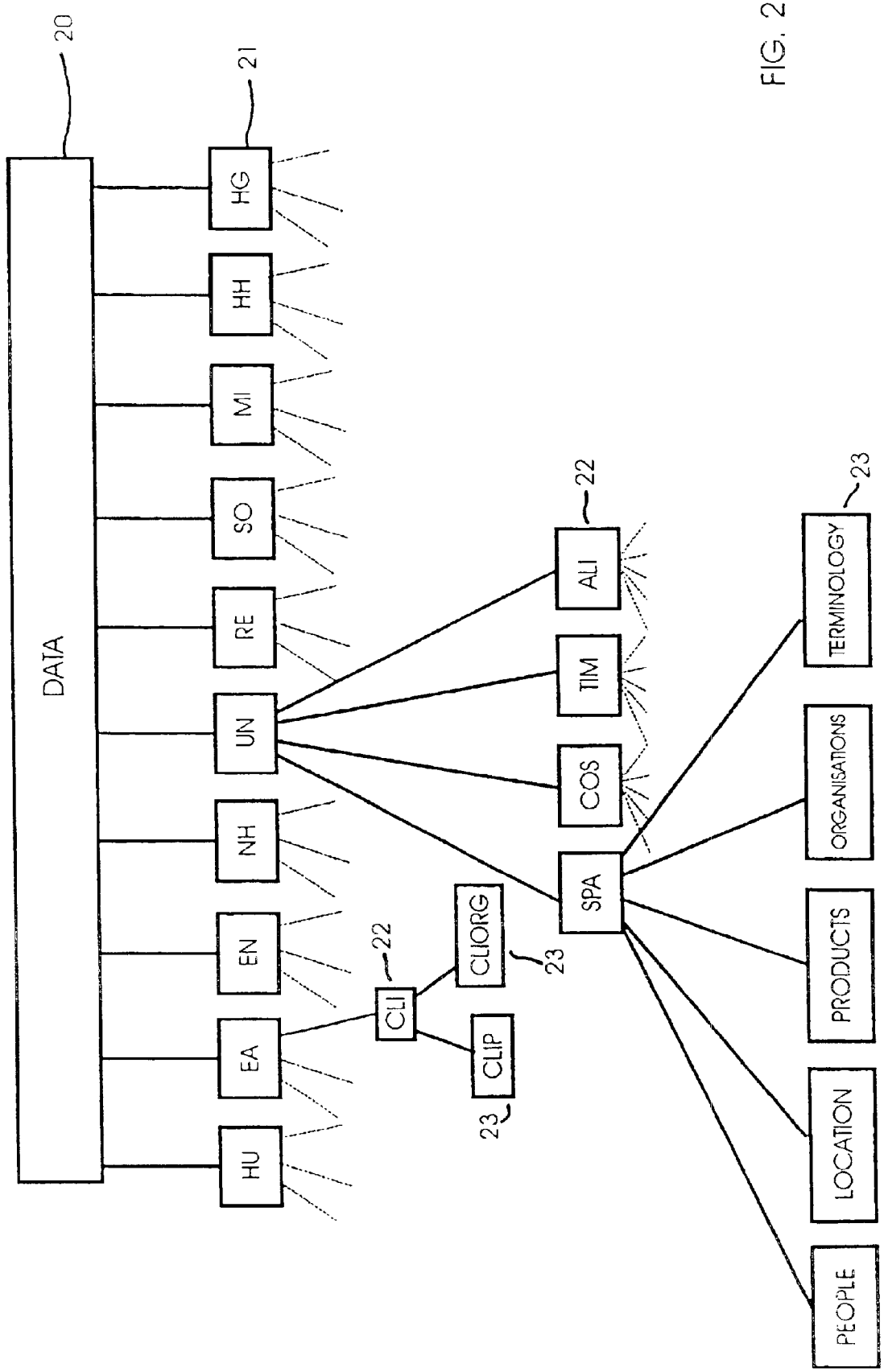
FIG. 2 shows diagrammatically how terms are divided into subject matter areas or domains.

FIG. 2 illustrates functionally the overall structure of a database which is accessible by the processor 1 of the computing system from one of the local data storage devices (such as the hard disk drive 4 or one of the two removable disk drives 5 and 6) or remotely via the MODEM 10 or the LAN/WAN connection 11. The database consists of: 1) a classification scheme and accompanying classification scheme data set; and 2) a classified vocabulary consisting of classified terms. Block 20 in FIG. 2 illustrates schematically the classification scheme. The classified terms may relate to any information known in the world and the classified vocabulary can cover all of the subject matter categories of the database shown in FIG. 2. As illustrated in FIG. 2, the classification scheme classifies terms into ten major subject matter areas or domains 21 with, in this example, the major domains being: the Universe (UN), the earth (EA), the environment (EN), natural history (NH), humanity (HU), recreation (RE), society (SO), the mind (MI), human history (HH) and human geography (HG).

In the classification scheme, each of these major subject matter areas is divided into subsidiary subject matter areas or subsidiary domains. FIG. 2 illustrates this schematically only for the major subject matter area UN (the Universe) and partly for the major subject matter area EA (the Earth). As shown in FIG. 2, the subject matter area UN is divided into four subsidiary subject matter areas: space exploration (SPA), cosmology (COS), time (TIM), and aliens and other signs of extraterrestrial life (ALI). Although not shown in this example, each of these subsidiary subject matter areas or domains may be itself divided into a number of subsidiary subject matter areas or domains which may in turn be divided into further smaller subject matter areas or domains and so on. It will, of course, be appreciated that there are areas of overlap between the identified subject matter areas and that some terms may be classified in more than one subsidiary subject matter area or domain or even in more than one major subject matter area or domain.

Each (major or subsidiary) subject area or domain has five species areas or genera 23 which are, in this example, people, locations, products, organisations and terminology. The genus 'product' includes the names by which anything may be sold which will include, in addition to trade names and trade marks, song and book titles, for example. The genus 'terminology' includes general concepts in the related subject matter area or domain. Any one item of data can belong only to one genus although it may belong to more than one (major or subsidiary) subject matter area or domain. Thus, each meaning of a term in the classified vocabulary will be allocated to a specific category in the classification scheme with the specific category being defined by its allocated major and subsidiary subject matter areas or domains and its allocated genus. This facilitates differentiation between use of the same word as a common noun, a person's name and the name of an organization because the database treats the three different meanings of the same word as being different terms because they are allocated to different ones of the five genera.

To facilitate understanding of the database structure, specific examples will be given below.

Thus, a term which relates to space exploration will be classified in the subsidiary subject matter area or domain (SPA) within the major subject matter area or domain (UN). Each classified term within the subsidiary subject matter area (SPA) will then be allocated to one of the five genera. Thus, for example, terms consisting of the names of astronauts, cosmonauts and mission control personnel will be allocated to the genus 'people' and so to a category defined by the combination of the subject matter and the genus with, in this example, a classification code: UN SPA SPAP, where the latter four letter term indicates the genus, that is people (P), in the subsidiary domain SPA. In contrast, terms consisting of the names of space exploration organisations will be allocated to the genus 'organizations' and will have a category or classification code: UN SPA SPAORG where the last three letters of the final part of the code indicates that the genus is the organization genus.

To take another example, one of the subsidiary subject matter areas of the major subject matter area or domain 'the earth' is climate (CLI) and the field of meteorology is classified at: EA CLI. Terms consisting of the names of meteorologists are classified in category: earth-climate-people (classification code EA CL CLIP) while the term "the UK meteorological office" is classified in the category: earth-climate-organizations (classification code EA CLI CLIORG). The term "UK meteorological office" may also be classified in: human geography; Europe; UK; organizations (classification code HG EU UKIORG) to enable it to be identified as a UK organization independently of its existence within the field of meteorology.

It will, of course, be appreciated that the above subsidiary subject matter areas are examples only and that the person skilled in the art may adopt or add different subject matter divisions. Generally, however, the ten major subject matter areas or domain will be those given above. Similarly, the five particular genus selected are exemplary and it is possible that alternative genera may be used. What is, however, important is that all terms are classified in accordance with the classification scheme with each classified term being allocated to one or more specific subject matter areas (which may be a subsidiary subject matter area within a major or other subsidiary subject matter area) but only to one specific one of the available genera so as to enable disambiguation between different meanings of the same word, phrase or abbreviation.

As illustrated schematically by FIG. 3A, each entry 30 in the classified vocabulary consists of the classified term 31, a description 32 which comprises a word or phrase describing the general nature or subject matter area domain of the term, a definition 33 and, in this example, a category ID (CAT ID) which identifies the category to which the term is allocated. Because the category ID is unique to the classification code, the classification code may be used in place of the category ID in FIG. 3A.

Each entry in the classified vocabulary may also include a field 35 for containing part of speech (for example noun, verb, adjective, adverb) information to assist in document classification and fields 36 and 37 for containing inflected forms and abbreviations and derivatives so that the classified vocabulary need contain only an entry for the root term and does not require separate entries for inflections, derivatives and abbreviations.

Two examples of vocabulary entries are shown below. These entries omit, in the interests of clarity, inflections and abbreviations or derivatives.

EXAMPLE 1

| Term: | Depression. |
|---|---|
| Description: | Economics. |
| Definition: | A period of low business and industrial activity accompanied by a rise in unemployment. |
| Classification Code: | SO ECO ECOGEN (society-economics-economic terminology). |
| Part of speech: | Noun |

EXAMPLE 2

| Term: | Tony Blair. |
|---|---|
| Description: | Politician |
| Definition: | UK Politician, leader of the Labour Party and Prime Minister from 1 May 1997. |
| Classification Code: | SO POL POLP (society-politics-person). |
| Part of speech: | Proper nouns. |

Each different category (that is each specific combination of subject matter subsidiary domain and genus) is associated with a unique classification scheme data set item CL in the classification scheme data set. FIG. 3B illustrates the basic structure of an item CL in the classification scheme data set.

Each classification scheme data set item CL includes the corresponding classification code and collocation for the category and a characterisation which gives a brief description of the category.

As noted above, the collocation consists of terms that exemplify the category and which would frequently be found in documents that should fall within the category. For example, a collocation will include terms which may be used to describe the function, appearance or relationship with other objects of the classified terms in the associated category or any other terms (for example 'buy', 'sell' in relation to cars) which may generally be used in the same context as the classified terms. For example, where the item of data is the term 'depression' in the economic sense, then terms which may be included in the corresponding collocation include: economy, employment, low, poor, poverty, market, social, failure, money, jobs etc.

It should, of course, be understood that the classification scheme data set items CL are in no way the same as the set of sub-headings which will generally be found in a standard library classification under each subject matter heading. Such sub-headings are analogous to the subsidiary subject matter domains mentioned above in that they define subject matter areas or specific topics which fall within the main headings. Such sub-headings do not relate to terms which may be used in discussing or describing items of data falling within the category or heading.

The collocations for the categories recognized within the classification system are determined using a mixture of encyclopaedic and lexicographical criteria. They are not just subject lexicons in the usual sense; for example, as a test case, a collocation lexicon for the category of meat within nutrition would include terms for various kinds of meat foodstuffs (lamb, pork, beef, poultry, etc) but also general words to do with the category (eat, cook, joint, fat, grilled, etc).

The collocations do not just identify domain A compared with domain B (e.g. meteorology vs literature), but levels of sub-domain within a domain (e.g. literature vs novel vs types of novel). The terms within the collocations are derived from three main sources:

1) Encyclopaedic sources including:
   i) relevant headwords and words within entries belonging to a particular domain, as displayed in encyclopaedias such as The Cambridge Encyclopaedia, and associated publications; and
   ii) relevant headwords taken from specialist sources outside of the above, for example place-names for a particular country from atlases, environmental terms from the indexes of various specialized works on the environment.

2) Lexicographic sources including:
   i) relevant headwords taken from dictionaries such as the Chambers Dictionary; and
   ii) relevant headwords taken from conceptually and alphabetically organized thesauri.

3) Other sources such as:
   i) relevant words found in a set of records after searching a particular subject matter domain on the Internet;
   ii) relevant words taken from a frequency listing of words in a set of Internet records; and
   iii) human input from a person collating the collocations using the above information.

The terms providing a collocation may be grouped within the collocation, according to their relevance to the category.

Where a classified vocabulary entry 30 gives, as shown in FIG. 3A, a category ID rather than the classification code then, as shown in FIG. 3B, each classification scheme data set item CL will include the appropriate category ID so that each classified term in the classified vocabulary is linked to a unique classification scheme data set item CL by the category ID. As noted above, this linking may be achieved by the classification codes. However, the use of a separate category ID is more efficient in computing terms.

The attached Appendix A lists examples of items classified vocabulary entries and the associated classification scheme data set items.

Section 1 of Appendix A lists two entries in the classified vocabulary both relating to the word 'bayonet'. The first example given in Appendix A is for the term 'bayonet' when used in the term of a light bulb fitting while the second entry is for the term 'bayonet' when used in the context of a camera lens fitting. As can be seen from Appendix A, these two meanings of the term 'bayonet' have different category IDs with the category ID for the light bulb fitting being 00010 and the category ID for the camera lens fitting being 0020 in this example.

Section 2 of Appendix A shows the classification scheme data set items identified by the category numbers 00010 and 00020. As can be seen from Appendix A, each classification scheme data set item is headed by its category ID followed by the classification code defined by the code for the main domain followed by the code for each subsidiary domain with these in turn being followed by the collocation only a part of which is shown in Appendix A for each of the two classification scheme data set items.

Terms to be classified using the apparatus shown in FIG. 1 may be supplied via one of the removable disk drives, for example on a floppy disk or CD ROM, via the scanner 12 and optical character recognition software stored on the hard disk 4 or from another similar computer via the LAN/WAN interface 11 or the MODEM 10. Alternatively or additionally, terms to be classified may be input manually by a user using the input device 8.

Individual terms may be manually classified by the user using the input device. Thus, the processor 1 will first cause the display 7 to display the table shown in FIG. 3A. Where the terms are being entered manually by the user, the user will first fill in the term in the cell 31a in FIG. 3A. If, however, the terms to be classified have been already supplied to the processor 1 and stored on the hard disk 4, then the processor 1 may be programmed to cause a first one of the terms to be displayed in the cell 31a for classification by the user and then for another term (for example the next term in an alphabetical order of the data stored on the hard disk) to be displayed once the user has classified the current term and so on. Alternatively, the processor may display all of the stored data on the display 7 and allow the user to select a term for classification by highlighting it in known manner.

Once the term to be classified has been entered into the cell 31a, the user then enters in the cell 32a a description in the form of a word or phrase describing the general nature or subject matter area of the term. For example, where the term is 'depression' in the economic sense as mentioned above, then the description entered by the user may be 'economics'.

Once the user has entered the description, the processor 1 prompts the user to enter a definition of the specific term into cell 33a. Where the term is 'depression' then the user may enter: 'a period of low business and industrial activity accompanied by a rise in unemployment' or some other similar short description.

The category ID may be determined manually by the user referring to a hard copy list of the classification codes or may be determined using the computer. Thus, for example, the processor may first request the user to select one of the ten major subject matter areas or domains and then, once the major subject matter area or domain has been selected, request the user to select one of the available subsidiary domains and, once the subsidiary domain has been selected, a subsidiary domain of that domain if it exists, and so on. Once the subject area subsidiary domain has been determined, the processor may then request the user to select the required genus. Once the user has done this, then the processor 1 determines the classification code and category ID from a classification code key stored in memory (for example in the ROM 3 or on the hard disk 4). Once the category ID has been determined and entered in the cell 34a, the processor 1 may prompt the user to enter, in turn, data indicating the part of speech in cell 35a, details of inflected forms in cell 36a and details of abbreviations and derivatives in cell 37a. Where the processor 1 has access to a dictionary, for example, where an electronic dictionary is stored on the hard disc drive 4 or on a removable disc inserted into one of the drives RD1 and RD2 or an electronic dictionary is accessible via the LAN/WAN interface 11 or over the Internet then the processor 1 may be programmed to determine inflections, abbreviations and derivatives automatically from electronically available dictionary sources. Once the data has been entered in cell 37a, then the processor 1 may request the user to confirm that the entry is correct and, once this has been done, the processor will store the classified term in the classified vocabulary so that the category ID determined by the user links the classified term to the appropriate item in the classification scheme data set.

Once all the desired terms have been classified, the classified vocabulary consisting of the classified terms each with their description, definition and category ID may be written onto a removable disk of the removable disk disk drive 5 or 6 or supplied as a signal to, via a network or the Internet, for example, another computing system. It will be appreciated that although the classified vocabulary may change or need to be updated fairly frequently, updating or changing of the classification scheme data set may be required less frequently. Accordingly, because the classification scheme data set would generally constitute a relatively large amount of data which requires infrequent modification, the classification scheme data set may be stored separately from the classified vocabulary, for example on a separate CD ROM. It will, of course, be appreciated that the computer apparatus shown in FIG. 1 may not be the original source of the classification scheme data set subsidiary database but that this may be accessed by the processor 1 via a disk inserted into one of the two removable disk disk drives or via the LAN/WAN interface or via the MODEM 10; for example, the classification scheme data set may be accessed via the Internet from another web site.

For convenience, the classified vocabulary and classification scheme data set may both be written by the processor onto a removable disk which may be, for example, a writable CD (compact disc) or both be supplied as a signal to another computing system. Where the classified vocabulary is specific to one or more of the subject matter areas 21 shown in FIG. 2, then it would, of course, be necessary for the processor 1 to write to the removable disk or incorporate in the signal only those items of the classification scheme data set appropriate for those subject matter areas or domains.

The database described above comprising the classified vocabulary and the classification scheme consisting of the classification scheme data set has many applications. For example, once the processor 1 has access to the classified vocabulary and the classification scheme data set, text documents can be classified automatically using the apparatus shown in FIG. 1.

Figure 4:
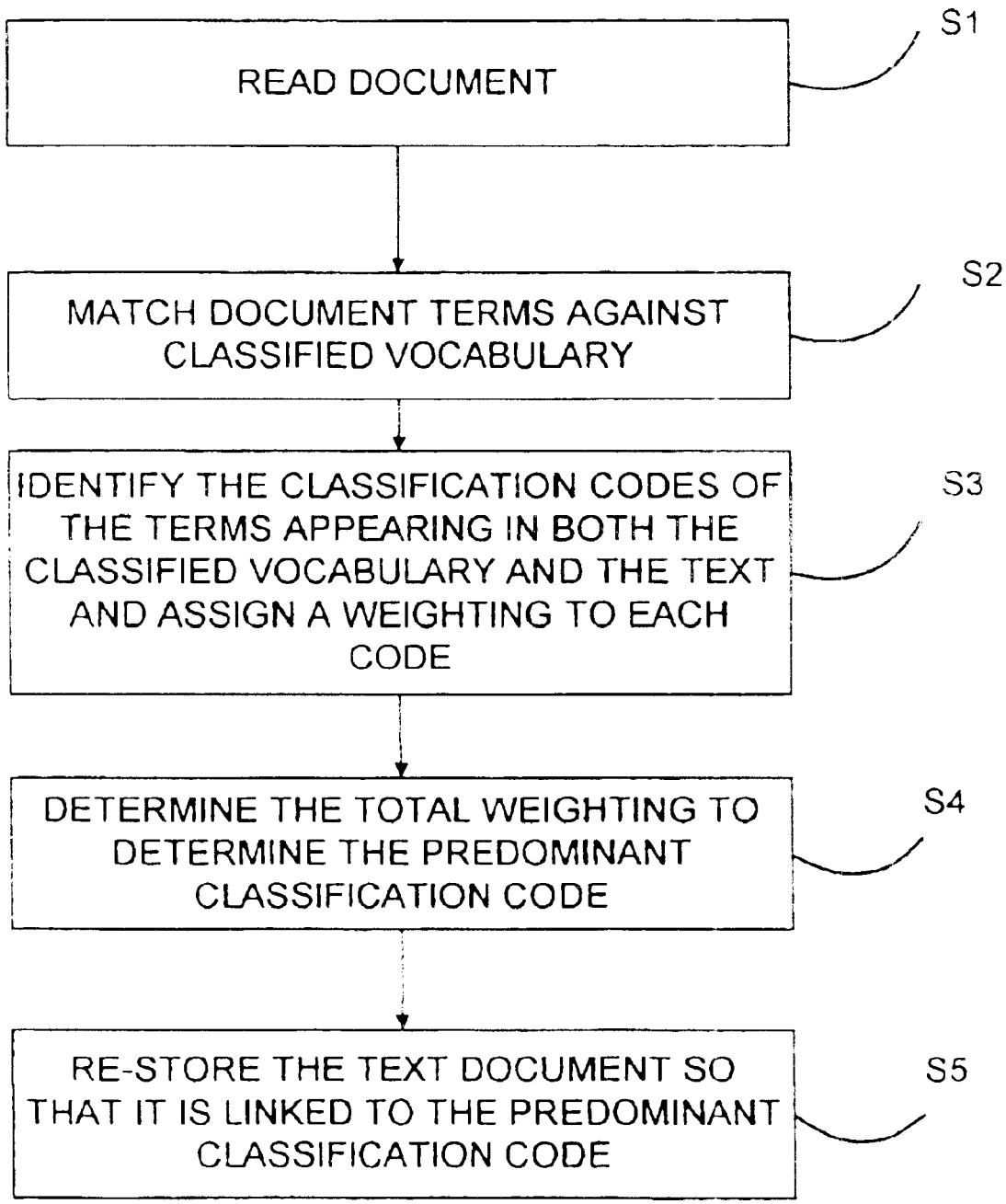
FIG. 4 shows a flowchart for illustrating use of apparatus embodying the invention for classifying a text or document.

FIG. 4 shows a flowchart for illustrating automatic classification of a text document.

In order for the computer apparatus to classify a text document it must, of course, be in computer readable form. Where the text document is supplied as an electrical signal via the LAN/WAN 11, the MODEM 10 or via a removable disk inserted into one of the removable disk disk drives 5 and 6, this will already be the case. Where the document to be classified is not in an electronic form, then the scanner 12 and conventional optical character recognition software may be used to convert the text document into a form readable by the computer. As another possibility, the text may be entered verbally if the computing system has speech recognition software.

Whichever way the text document is provided to the computing system, it is first stored on the hard disk 4. The processor 1 then reads the document at step S1, matches the terms used in the text document being classified against the classified vocabulary at step S2, identifies (at step S3) the classification codes of the terms found in both the classified vocabulary and the text document by using the classified vocabulary and classification scheme data set (see FIGS. 3A and 3B) and assigns a weighting to each classification code. The processor 1 then determines the total weighting for each classification code at step S4 to determine the predominant classification code and then, at step S5, re-stores the text document with the predominant code so that the text document is linked with the appropriate classification scheme data set item.

Weighting of the classification codes may be carried out according to a number of different parameters and the criteria for assigning a classification code with confidence will vary from application to application. However, one way of weighting the classification codes which works well in practice is to assign each term in the text document a total weighting of one and to divide that total weighting by the number of classification codes which may relate to that term so that where a term has a number of different senses (such as the term "depression", for example) the processor 1 will identify the classification code for each sense and will assign each classification code a weighting of 1/n where n is the number of classification codes identified for the term. Another approach is for the processor 1 to assign a weighting only to terms associated with the single classification codes, however this does not give good results in practice. Another alternative approach is for the processor 1 to process the text document sentence by sentence, determine a weighted classification code for each sentence and then to combine the sentence classification codes. Provided the processor 1 has access to some elementary grammatical rules (for example stored on the hard disc drive), this approach enables the processor 1 to take advantage of the part of speech information in the classified vocabulary to assist in differentiating between different senses of the same word. Generally extremely frequent words such as "a", "the", "but", "and", "can", "it" etc. will be ignored in step S2.

The description above with reference to FIG. 4 assumes that each text document will be allocated to a single category. Generally, however, text documents may be classifiable in more than one subject matter area and more than one genus. Accordingly, instead of identifying the classification codes of the classified terms having the most matches at step S3, the processor 1 may identify each classification code having greater than a predetermined percentage of matches according to the weighting and may then determine at step S4 one or more classification codes which relate to the document, thereby linking the document to each of the relevant classification scheme data set items.

The automatic classification software may also provide a user with a mechanism for overriding or modifying an automatic allocated classification code. For example, the instructions supplied to the processor may cause a user to be alerted via the display 7 if the processor 1 has been unable to allocate a classification code or codes to the text document, so allowing the user to classify such documents manually.

FIGS. 5 to 10 illustrate another example of the use of the database described above. In this example, the computing system shown in FIG. 1 is configured to conduct a search via the world wide web. This is achieved by connection to the Internet via the MODEM 10 and the use of a conventional world wide web browser such as Netscape or Microsoft Explorer.

Figure 5:
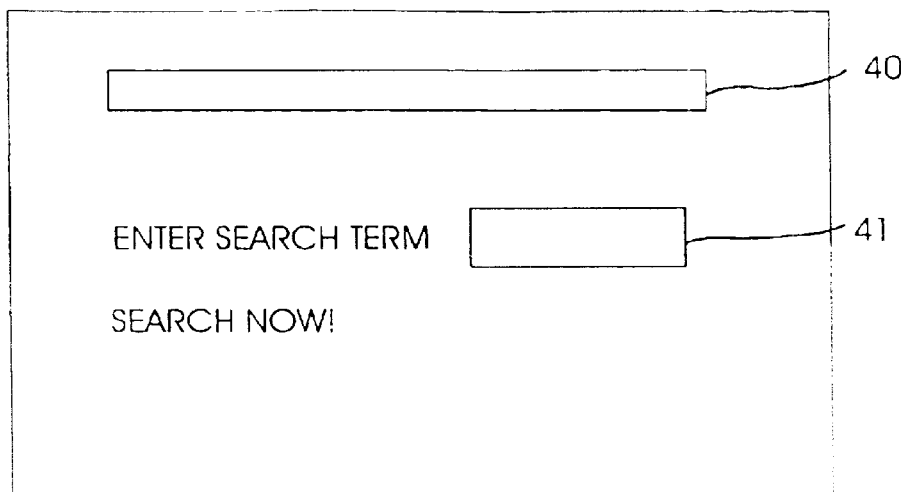

Initially, when a user wishes to search for documents relating to a particular topic, the user activates one of the search engines available on the world wide web causing a user interface similar to that shown in FIG. 5 to be displayed on the display 7 where the box 40 illustrates diagrammatically where the logo and other information relating to the selected search engine would be displayed.

Once the user interface has been displayed, the user is prompted to enter the required search keyword in box 41 and then to instigate the search by, for example, positioning the cursor using the mouse or other pointing device over the phrase 'Search Now!' and then clicking.

Once the user has initiated the search, the search engine carries out the search in conventional manner. However, when the search engine returns the results of the search, the processor 1 intercepts and stores these before displaying them to the user and reads the search keyword input by the user (step S6 in FIG. 10). Although not shown in the figures, at this stage the processor 1 may inform the user via the display 7 that the search results have been received and give the user the option of continuing on-line or storing the results of the search so as to minimise on-line time and thus charges.

Figure 6:
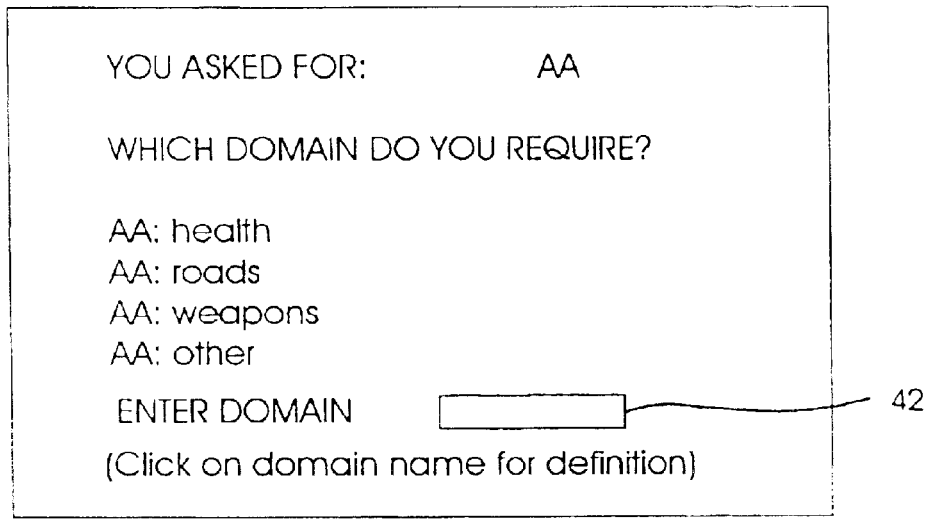

The processor 1 then checks the classified vocabulary of the database for matches to the keyword used to initiate the search (step S7). Where matches in different categories (which may or may not be genus specific) are identified, the processor 1 reads the description from the classified vocabulary for each term and displays it to the user with a request for the user to select the category required (step S8). FIG. 6 illustrates an example of this user interface. As shown in FIG. 6, the keyword entered by the user was 'AA' and three defined subject matter domains were identified—health, roads and weapons. In addition to these, the processor 1 causes the display 7 to give the user the option of selecting the domain (other, that is an undefined domain which is none of the identified domains.

Figure 7:
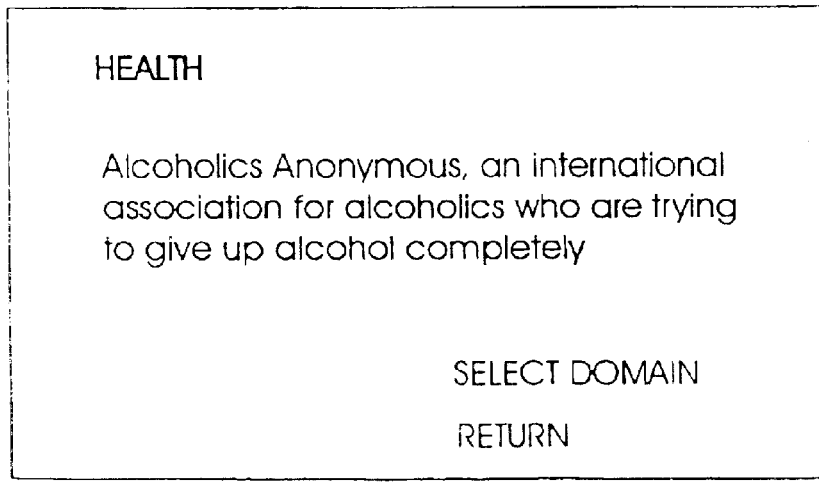
Figure 10:
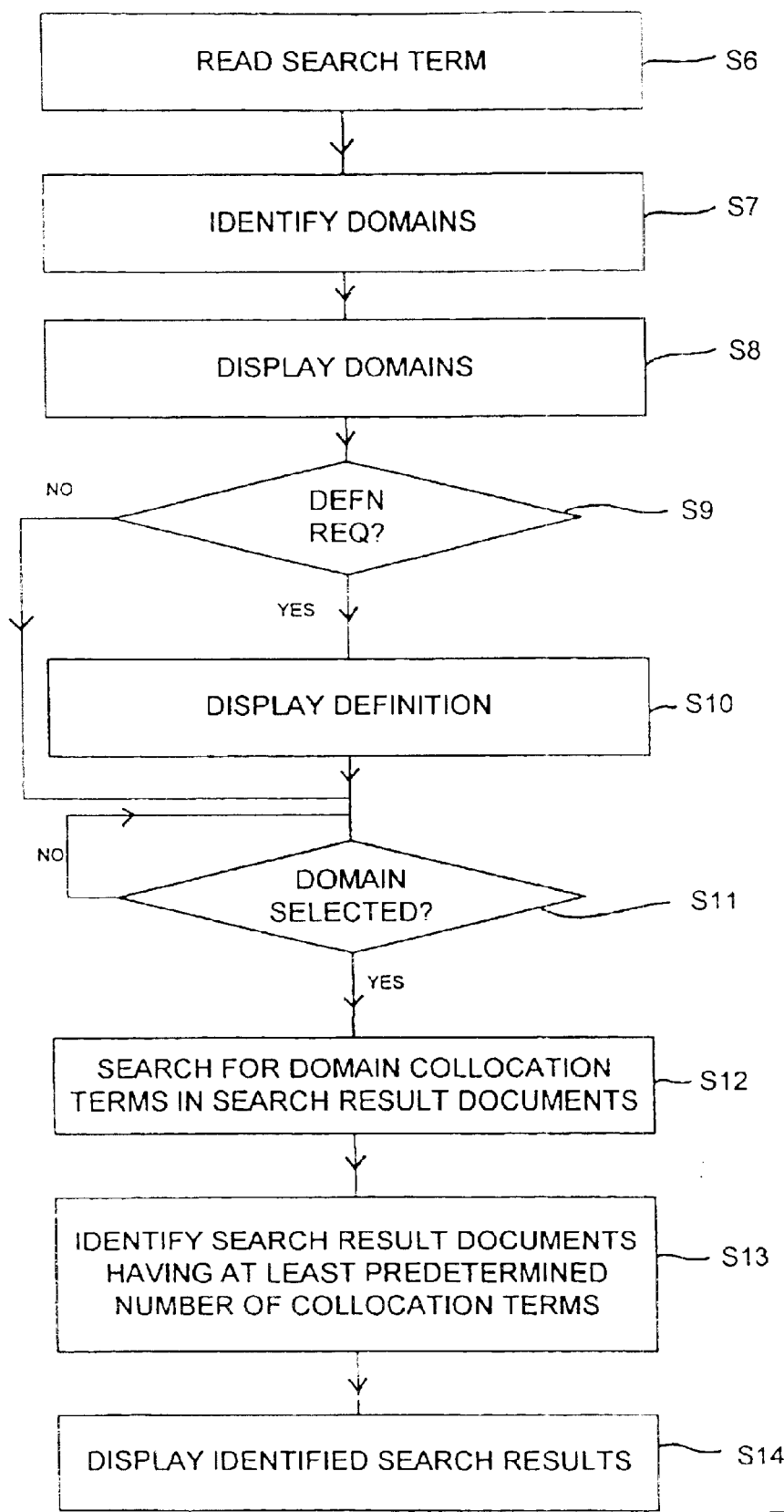
FIG. 10 shows a flow chart for illustrating a method embodying the invention of refining the results of a search.

The user interface prompts the user to enter the desired domain in box 42 in FIG. 6 or, if he is unsure of the desired domain, to click on the domain name for a definition. If a definition is requested (step S9) the processor then displays the selected definition on display 7 (step S10). FIGS. 7, 8 and 9 show, respectively, the subsequent screens which would be displayed if the user clicked on health, roads or weapons, respectively. As will be appreciated, each of these displays shows the definition stored in the classified vocabulary for the term in that domain.

If the user enters the required domain in FIG. 6 by typing in health, roads, weapons or other or selects the domain from the definition screen 7, 8 or 9 by clicking on the words 'Select Domain' (that is the answer at step S11 is yes), then the processor 1 calls up the collocation of the classified scheme data set item for the selected domain and searches at step S12 for the use of terms listed in the collocation in the documents forming the search results.

The process or then determines at step S13 which of the search results documents have at least a predetermined number of matches with the collocation terms and then displays to the user at step S14 only those search results documents having at least the predetermined number of collocation terms. If the domain 'other' is selected, the processor lists those documents not containing (or containing the least number of) terms used in the collocations associated with the other three domains. The processor may order the search results in accordance with the number of matches with the collocation terms of the selected domain and may list all of the search results in an order determined by the number of matches with the selected collocation with the highest number of matches being listed first or may display a given number of the search results for example the first ten or twenty search results to the user.

By using the collocations, the processor 1 can disambiguate different meanings of the same word and the search results produced by the search engine can be refined so as to select only those documents which use terms relevant to or which would be used in discussing or describing the keyword in the subject matter area or domain selected by the user. Thus, the search results relating to the use of the term 'AA' in subject matter areas different from the one selected by the user can be filtered out so that, for example, if the user selects the domain: 'AA:HEALTH', he will be provided with only the documents relating to Alcoholics Anonymous and not documents relating to the Automobile Association or anti-aircraft weapons.

Figure 11:
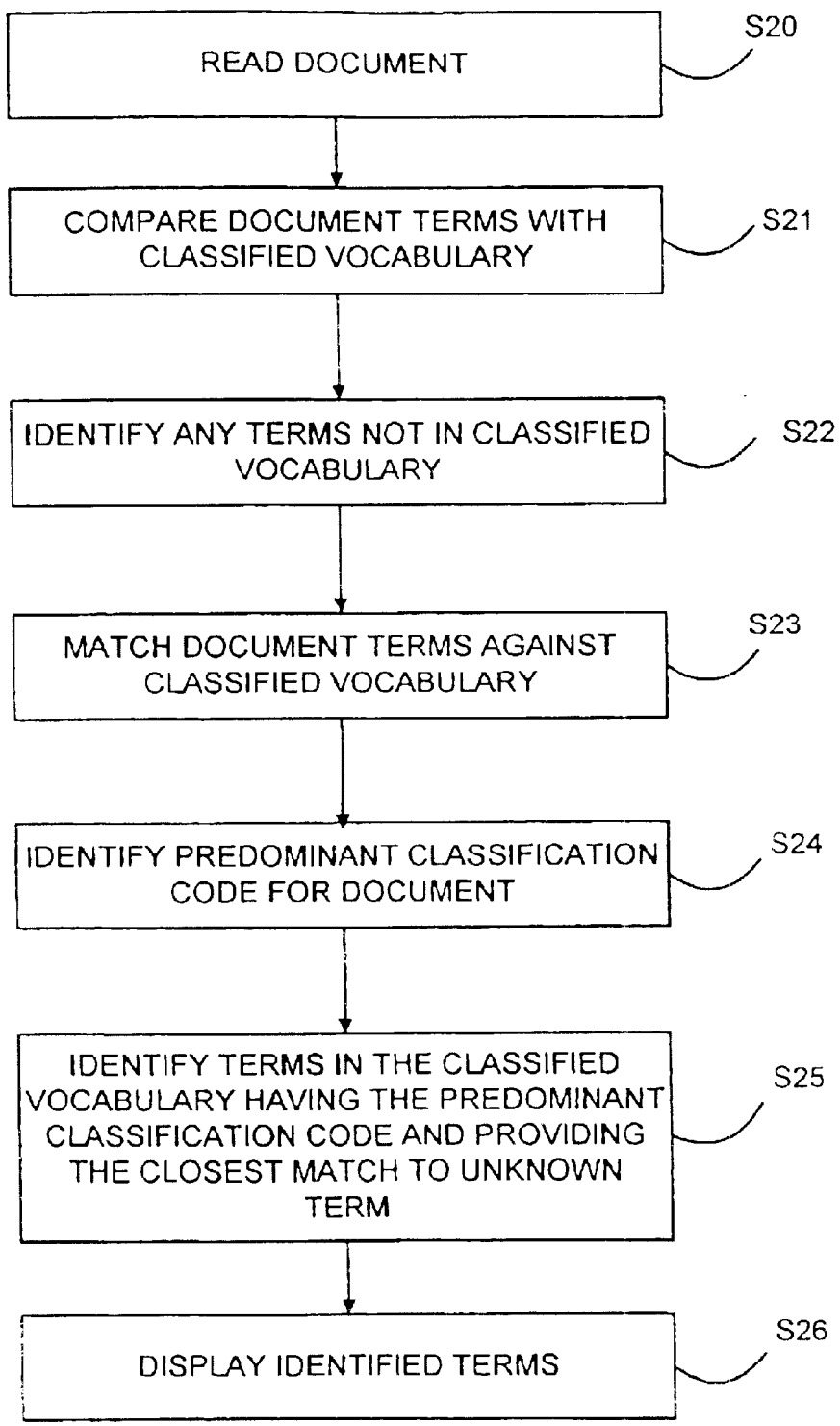
FIG. 11 shows a flowchart for illustrating use of apparatus embodying the invention for checking the spelling of terms in a document.

A further application of the database will now be described with reference to FIGS. 11 and 12.

Commonly used software applications such as word processors, databases and spreadsheets need to be able to validate words. However, current spelling checkers are extremely limited in their application. For example, most current spelling checkers cannot identify place names, product names, company names and the names of people, particularly surnames, where these words are not also common nouns.

The spelling checkers of such word processors, database and spreadsheets may, however, be modified using the apparatus described above and the classification scheme data set to enable far more accurate verification of text.

In this example, the dictionary of a conventional spelling checker is replaced by the database described above. When instructed to verify the text, the processor first reads the document at step S20, compares the terms used in the document with the classified vocabulary of the database at step S21, identifies at step S22 any terms not in the vocabulary then matches at step S23 the document terms against the terms in classified vocabulary so as to determine at step S24 the domain having the most matches so as to determine the subject matter area and so the classification code of the document. This is carried out in a similar manner to the automatic document classification discussed above with reference to FIG. 4. Steps S21 and S22 may be carried out after steps S23 and S24.

Once the subject matter area of the document has been determined, the processor 1 at step S25 checks for terms in classified vocabulary which have the same classification code as that allocated to the document and are closest in spelling to the unknown term and displays these to the user at step S26. This enables the selection of the possible alternatives for the unknown word or term to be specifically directed toward the subject matter of the document being checked so that inappropriate alternatives are not presented.

Figure 12:
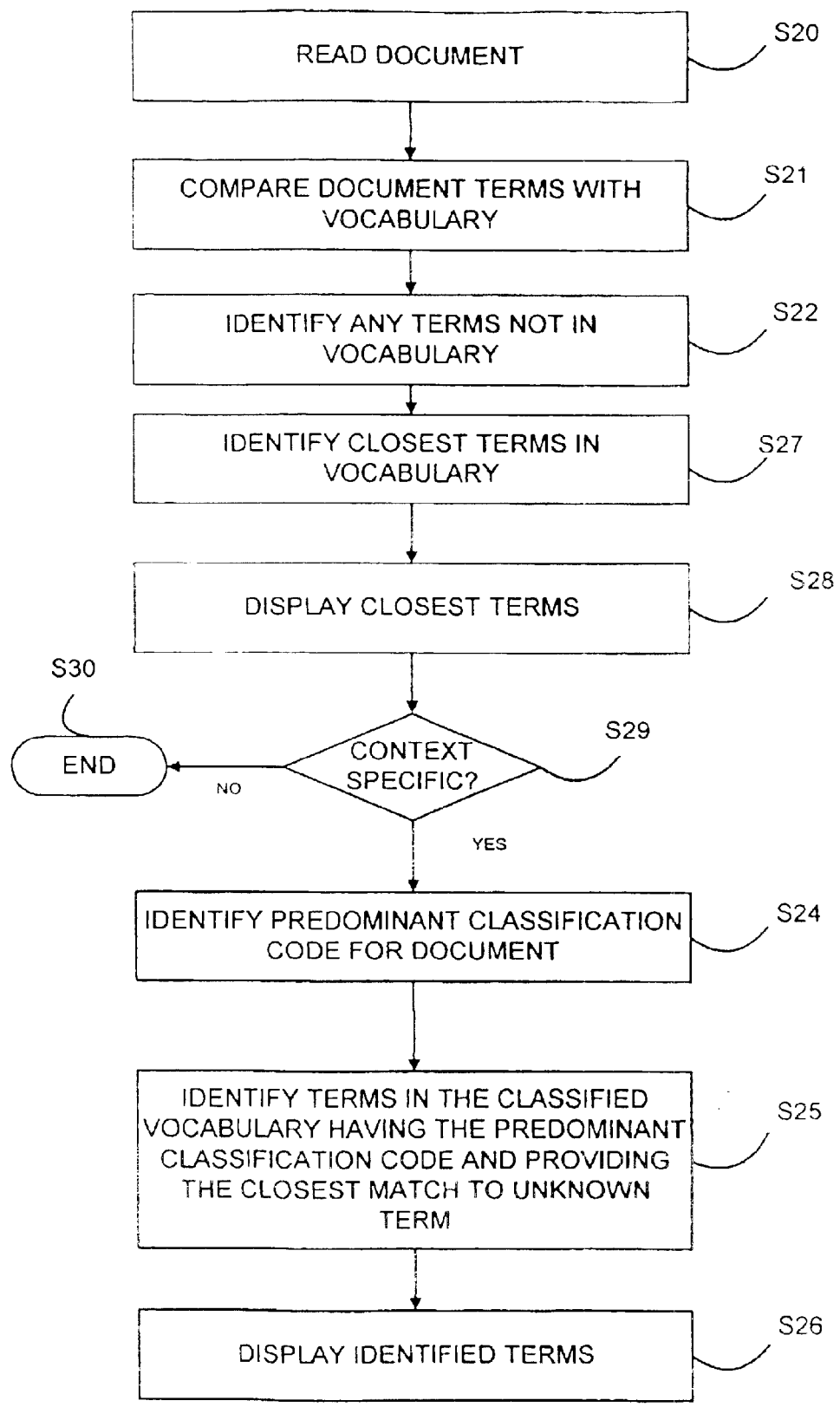
FIG. 12 shows a flow chart for illustrating use of apparatus embodying the invention for checking for usage of terms in a document.

FIG. 12 shows a flowchart illustrating a modification of the process described with reference to FIG. 11. In the modification shown in FIG. 12, after the processor 1 has identified any terms not in the classified vocabulary at step S22, the processor 1 identifies at step S27 the closest terms or most likely terms in the vocabulary regardless of their classification code, that is regardless of their subject matter area or domain and then displays these closest terms to the user at step S28 via the user interface. At this time, as indicated by step S29, the processor also requests the use, via the user interface, to select whether or not context specific identification of possible closest terms is required. If the answer is no, then the spell checking is terminated at step S30. If, however, the answer is yes, then the processor proceeds to steps S24 to S26 as discussed with reference to FIG. 11. This enables the user to select whether or not context or subject matter specific selection of possible alternatives for the unknown word is required.

The above description suggests that a single general database consisting of the classified vocabulary and the accompanying classification scheme data set will be provided. This need, however, not be the case. Rather, the contents of the database provided may be specific to the requirements of the user with, for example, a particular user perhaps only being provided with the classified vocabulary for a specific subject matter area or areas and the associated classification scheme data set item or items. Additionally, the general database or a specific such database may be supplemented by additional classified terms specific to a particular user's requirements. Thus, individual lists of specialist classified terms may be prepared and supplied together with related items of the classification scheme data set. Examples of such specialist classified vocabulary lists are, for example, lists of pharmaceutical compound names and chemical names for the pharmaceutical industry, specialist lists of persons involved in a specific field, for example a list of all recognized chemists in a particular field or all recognized scientists such as, for example, people like Einstein, Oppenheimer, Newton etc.

Such classified lists may provide a key to standardized data and therefore greatly improve retrieval of data from a database. At present, some companies may have their own internal standards or authority files to ensure that employees are using the same terminology but with the growing use of the Internet and intranets there is a fast growing need for standard data than can be used for all organisations around the world. Classified lists provide a powerful way of establishing standard specialist vocabularies. Such specialist vocabulary classified lists may be used, for example, to supplement word processing spell checkers such as those described above with reference to FIGS. 11 and 12. For example, the pharmaceutical industry may be provided with one or more classified lists listing the chemical and trade names of pharmaceuticals and related terminology. Other classified lists may include specialist lists of persons recognized in a particular field, for example recognized physicists or chemists or a classified list which enables different language versions of the same name to be identified (for example Vienna and Wien) for example to facilitate postal services.

The apparatus described above may also be used to index documents. Thus, for example, where specialist classified lists are provided, then documents in the field of the specialist classified list may be indexed in accordance with that list. For example, the processor 1 may index documents in the field of chemistry in accordance with the names of recognized chemists appearing in those documents by comparing the terms used in the documents with specialist classified lists accessible to the processor 1 and then indexing each document under each term in the specialist classified list identified in the document. This would enable, for example, a researcher to identify all papers published by a specific person identified in the classified list or to extract all documents referring to each of a number of persons identified in the classified list.

As noted above, because the database is classified both as to subject matter and as to genus, it enables the processor 1 to validate words including proper nouns which are stored in the classified vocabulary, to differentiate between semantic items, for example the use of the word 'wood' as a surname or as a material, to identify the use of common terms as also being names of products, to provide via the classified lists variants on forms or spellings of names such as Vienna/Wien and to provide, again via the classified lists, lists of specialist terms for example all chemical compounds, all mathematicians, all units of currency as required by the end user. Moreover, because the classification scheme is modular, an end user may be supplied with only a part of the classified vocabulary specific to his particular needs with the associated classification scheme data set items without having to make any modifications to the classified vocabulary. Furthermore, the subject matter areas or domains can easily be refined by the addition of deeper and deeper levels of subsidiary domains without disturbing the overall structure of the database.

The classified vocabulary or items of data may be provided in different languages. Different classification scheme data sets will however be required for different languages because there is not always a direct correlation in meaning. The apparatus described above may be used to assist in translation of documents. In order to achieve this, the apparatus is given access to two different language versions of the database and to an electronically stored conventional dictionary providing translations of the source language into the required final language. In order to assist in the translation of the document, the apparatus first determines, in a manner similar to that described above with reference to FIG. 4, the category within which the source language document falls by comparing the terms used in the source language document against the source language classified vocabulary. Once the category of the document has been determined, the processor then looks up the translation of each word in the document using the electronic dictionary and, where a number of alternative translations are looks up the translation in the final language database and selects as the translation the term having the same category as the source term. Of course, the apparatus will generally not be used to provide an automatic translation of a document but simply to provide the user of the apparatus with a translation of the term which is specific to the context of the document to assist the user in preparing a more accurate translation. As another possibility, a first database consisting of a vocabulary of terms in one language and an associated classification scheme data set in that language may be associated within a second database consisting of a vocabulary of terms in a second language with the terms in the second vocabulary being associated with the same collocations as the first database. An apparatus provided with such databases would then be able to, at the request of a user, provide the user with a translation of a term in the document by determining the collocation associated with that term and then determining which possible translation of the term is associated with the same collocation. Such an arrangement could be associated with the above-mentioned classified list to provide or improve a foreign language dictionary.

As noted above as used herein, the term 'collocation' means a collection or list of terms which exemplify the domain or category with which the collocation is associated. However, the collocations may be ranked so that the terms within each collocation are arranged in order of significance. For example, the terms used in the collocation may be split into a number of groups of terms with the groups of terms being ordered in accordance with their significance to the domain with which they are associated. This would enable, where necessary or desired, limited numbers of the groups of terms to be used by the computing system. Limiting the number of terms in the collocation which are actually used in practice to those of most significance in relation to the subject matter area should facilitate more rapid carrying out by the computing system of the processors described above, for example, searching, classification or spell checking, with only a slight degradation in accuracy.

The classification scheme discussed above with reference to FIG. 2 may be associated with existing classification schemes. Thus, for example, a link may be provided between a particular subsidiary subject matter area or domain and an existing specialist classification scheme for that area. For example, a subsidiary subject matter area or domain directed toward patents may be linked to the international patent classification system and the subsidiary subject matter area relating to living organisms may, for example, be linked to the Whittacker system to enable advantage to be taken of the specialist information in those classification systems.

Although in the arrangements described above, each specific category is associated with a particular classification scheme data set item and thus with a specific collocation, items of data of different genus but falling within the same subject matter area or domain may share a collocation because frequently the same terms will be used in relation to items of data falling within different genus in the same subject matter area.

In the arrangement described above with reference to FIGS. 4, 11 and 12, the classified vocabulary is used to determine the category of a document. As another possibility, the terms used in a document to be classified may be compared against the collocations. This requires, however, that the text document be compared against each collocation in turn and then the collocation having the most number of matches be identified to determine the predominant category for the document. This approach relies on a fixed body of data and, because each collocation is specific to a category and each collocation has to be tested in turn, tends to be less accurate and takes longer to classify the document. In contrast, using the classified vocabulary which encompasses all subject matter areas of the database (possibly minus any extremely common or frequently used words such as "it", "an", "a", "and", "but", "can", "do" and so on) provides for greater flexibility and moreover results in quicker and more accurate classification of the vocabulary. It is preferred that the classified vocabulary be used for the document classification and the collocations be used for disambiguation such as in the case of the example described above with reference to FIGS. 5 to 10.

In the above examples, the classified vocabulary consists of classified terms. Conceivably, however, the classified vocabulary may be images, music or other sounds or non-textual matter. Of course, manual classification will be necessary if the items of data are not accompanied by related text.

It will be appreciated that the processor implementable instructions for causing the processor 1 to carry out any of the operations described above may be supplied via a storage medium insertable into a removable disk disk drive as discussed above. Alternatively, or additionally, the computer or processor implementable instructions can be supplied as a signal by, for example, downloading the code over a network which may be an intranet or the Internet. An aspect of the present invention thus provides a storage medium storing processor implementable instructions for controlling the processor to carry out one or more of the processes described above. Another aspect of the present invention provides an electrical signal carrying processor implementable instructions for controlling the processor to carry out one or more of the methods described above.

As noted above, the database for use by the apparatus may be supplied on a storage medium insertable into one of the removable disk disk drives or may be accessed remotely as a signal downloaded over a network such as the Internet or an intranet. Also, the classification scheme data set may be supplied separately from the classified vocabulary or items of data. The present invention thus also provides a storage medium storing a classified vocabulary or items of data and/or the classification scheme data set or items therefrom as discussed above. The present invention also provides an electrical signal carrying a classified vocabulary and/or the or some of the items from the classification scheme data set as discussed above.

In one aspect, the present invention provides apparatus for storing data on a computer readable storage medium, comprising:
  means for storing items of data;
  means for associating each item of data with one of a number of different categories of data;
  means for associating all items of data falling within the same category with a common code identifying a collocation of terms that exemplify that category so that items of data in different categories are associated with different codes identifying different collocations of terms with each collocation of terms being specific to the associated category; and
  means for directly or indirectly writing each item of data together with the associated code onto a computer readable storage medium.

In one aspect, the present invention provides apparatus for storing data on a computer readable storage medium, comprising:
  means for storing items of data;
  means for storing a plurality of different collocations of terms with the terms in each different collocation being terms that exemplify a specific different one of a plurality of categories of data;
  means for associating each item of data with one of said number of different categories of data;
  means for associating all items of data falling within the same category with a common code identifying which one of said collocations contains terms that exemplify items of data in that category so that items of data in different categories are associated with different codes identifying different ones of said collocations of terms; and
  means for directly or indirectly storing the plurality of collocations and each item of data together with its associated code onto a computer readable storage medium.

In one aspect, the present invention provides apparatus for storing data on a computer readable storage medium, comprising:
  means for storing items of data;
  means for associating each item of data with one of a number of different species of data and one of a number of different subject matter areas such that the associated species and subject matter area define a category for that item of data;
  means for associating all items of data falling within the same category with a common code identifying a collocation of terms that exemplify that category so that items of data in different categories are associated with different codes identifying different collocations of terms with each collocation of terms being specific to the associated category; and
  means for directly or indirectly writing each item of data together with the associated code onto a computer readable storage medium.

In one aspect, the present invention provides apparatus for storing data on a computer readable storage medium, comprising:
  means for storing items of data;
  means for storing a plurality of different collocations of terms with the terms in each different collocation being terms that exemplify items of data falling within a specific different combination of one of a number of different species of data and one of a number of different subject matter areas such that the associated species and subject matter area define a category for that item of data;
  means for associating each item of data with a category;
  means for associating all items of data falling within the same category with a common code identifying which one of said collocations contains terms exemplifying items of data in that category so that items of data in different categories are associated with different codes identifying different ones of said collocations of terms; and
  means for directly or indirectly storing the plurality of collocations and each item of data together with its associated code onto a computer readable storage medium.

In one aspect, the present invention provides apparatus for processing computer usable data, comprising:
  means for storing items of data;
  means for associating each item of data with one of a number of different categories of data;
  means for associating all items of data falling within the same category with a common code identifying a collocation of terms usable in relation to items of data in that category so that items of data in different categories are associated with different codes identifying different collocations of terms with each collocation of terms being specific to the associated category; and
  means for generating a signal carrying each item of data together with its associated code for supply to a computer readable storage medium.

In one aspect, the present invention provides apparatus for processing computer usable data, comprising:
  means for storing items of data;
  means for storing a plurality of different collocations of terms with the terms in each different collocation exemplifying items of data falling within a specific different one of a plurality of categories of data;
  means for associating each item of data with one of said number of different categories of data;
  means for associating all items of data falling within the same category with a common code identifying which one of said collocations contains terms exemplifying items of data in that category so that items of data in different categories are associated with different codes identifying different ones of said collocations of terms; and
  means for generating a signal carrying each item of data together with its associated code for supply to a computer readable storage medium.

In one aspect, the present invention provides apparatus for processing computer usable data, comprising:

means for storing items of data;

means for associating each item of data with one of a number of different species of data and one of a number of different subject matter areas such that the associated species and subject matter area define a category for that item of data;

means for associating all items of data falling within the same category with a common code identifying a collocation of terms usable in relation to items of data in that category so that items of data in different categories are associated with different codes identifying different collocations of terms with each collocation of terms being specific to the associated category; and means for generating a signal carrying each item of data together with its associated code for supply to a computer readable storage medium.

In one aspect, the present invention provides apparatus for storing data on a computer readable storage medium, comprising:

means for storing items of data;

means for storing a plurality of different collocations of terms with the terms in each different collocation exemplifying items of data falling within a specific different combination of one of a number of different species of data and one of a number of different subject matter areas such that the associated species and subject matter area define a category for that item of data;

means for associating each item of data with a category;

means for associating all items of data falling within the same category with a common code identifying which one of said collocations contains terms usable in relation to items of data in that category so that items of data in different categories are associated with different codes identifying different ones of said collocations of terms; and means for generating a signal carrying each item of data together with its associated code for supply to a computer readable storage medium.

In one aspect, the present invention provides a computer usable medium having computer readable instructions stored therein for causing the computer:

to associate each of a plurality of items with one of number of different categories;

to associate all the items of data falling within the same category with a common code identifying a collocation of terms exemplifying items of data in that category so that items of data in different categories are associated with different codes identifying different collocations of terms with each collocation of terms being specific to the associated category; and to generate a signal carrying each item of data together with its associated code for supply to a computer readable storage medium.

In one aspect, the present invention provides a computer usable medium having computer readable instructions stored therein for causing the computer:

to associate each of a plurality of items of data with one of a number of different species of data and one of a number of different subject matter areas such that the associated species and subject matter area define a category for that item of data;

to associate all items of data falling within the same category with a common code identifying a collocation exemplifying items of data in that category so that items of data in different categories are associated with different codes identifying different collocations of terms with each collocation of terms being specific to the associated category; and to generate a signal carrying each item of data together with its associated code for supply to a compute readable storage medium.

In one aspect, the present invention provides a computer usable medium having computer readable instructions stored therein for causing the computer:

to associate each of a plurality of items of data with one of a number of different categories of data;

to associate all items of data falling within the same category with a common code identifying a collocation of terms exemplifying items of data in that category so that items of data in different categories are associated with different codes identifying different collocations of terms with each collocation being specific to the associated category; and directly or indirectly to write each item of data together with the associated code onto a computer readable storage medium.

In one aspect, the present invention provides a computer usable medium having computer readable instructions stored therein for causing the computer:

to associate each of a plurality of items of data with one of a number of different species of data and one of a number of different subject matter areas such that the associated species and subject matter area define a category for that item of data;

to associate all items of data falling within the same category with a common code identifying a collocation of terms exemplifying that category so that items of data in different categories are associated with different codes identifying different collocations of terms with each collocation of terms being specific to the associated category; and directly or indirectly to write each item of data together with the associated code onto a computer readable storage medium.

In one aspect, the present invention provides apparatus for processing data comprising:

means for accessing from storage means a plurality of collocations of terms with each collocation being associated with a different category of data and containing terms exemplifying that category;

means for receiving items of data;

means for determining a collocation which is relevant to a received item of data; and means for processing the received item of data using terms from that collocation.

In one aspect, the present invention provides apparatus for checking the spelling of terms in a text, comprising:

means for receiving the text to be checked;

means for accessing first storage means storing a plurality of different collocations of terms with the terms in each collocation being usable in relation to a particular different category;

means for accessing second storage means storing a vocabulary with each term in the vocabulary being associated with a respective code identifying a specific one of said different collocations and a specific category for each different context or meaning of the term;

means for comparing the terms used in the text with the terms in the vocabulary to identify any terms in the text not present in the vocabulary;

means for, when unknown terms not present in the vocabulary are identified, comparing the rest of the terms in the text with the terms in the collocations to determine the collocation which has terms most closely matching the terms of the text to determining the category to which the text should be allocated;

means for determining any term in the vocabulary associated with the determined category for which the unknown term may be a misspelling; and means for advising a user of the determined term(s).

In one aspect, the present invention provides apparatus for classifying a text into one of a number of different subject matter categories, comprising:

means for receiving the text to be classified;

means for accessing storage means storing a plurality of different collocations of terms with the terms in each collocation being usable in relation to a particular subject matter category and each collocation being associated with a classification code identifying the particular subject matter category to which the collocation is relevant;

means for comparing terms used in the text with the terms in the collocations;

means for determining which of the collocations has the most terms in common with the text being classified; and means for allocating to the text the classification code associated with the determined collocation.

In one aspect, the present invention provides apparatus for refining the results of a subject matter search carried out by a search engine using a keyword, comprising:

means for accessing first storage means storing a plurality of different collocations of terms with the terms in each collocation exemplifying a particular different subject matter category;

means for accessing second storage means storing a vocabulary with each term in the vocabulary being associated with a respective code identifying a specific one of said different collocations and a specific category for each different context or meaning of the term;

means for receiving the results of the subject matter search;

means for comparing the keyword used to carry out the search with the term in the vocabulary to determine each category with which the keyword is associated;

means for advising a user of the different categories with which the keyword is associated;

user operable selection means for selecting one of the categories with which the keyword is associated;

means for comparing the terms used in text in each of the search results with the collocation of terms of the selected category; and means for advising the user of the search results for which the text has greater than a predetermined number of terms in common with the collocation for the selected category.

In one aspect, the present invention provides apparatus for checking the usage of terms in a text, comprising:

means for receiving the text to be checked;

means for accessing first storage means storing a classified vocabulary in which the terms are allocated to categories;

means for comparing terms in the text with the terms in the classified vocabulary to determine a category for the text; and means for identifying any terms not in the classified vocabulary; and means for advising the user of any term in the classified vocabulary similar to an unidentified term and having the determined category.

Other modifications will be apparent to those skilled in the art.

| APPENDIX A: data samples | |
|---|---|
| 1. Classified vocabulary | |
| TERM | bayonet |
| DESCRIPTION | technology |
| DEFINITION | type of fitting for a light bulb in which prongs on its side fit into slots to hold it in place |
| CAT ID | 00010 |
| TERM | bayonet |
| DESCRIPTION | Photography |
| DEFINITION | type of fitting for a camera lens in which prongs on its side fit into slots to hold it in |
| CAT ID | 00020 |

2. Classification scheme
CAT ID=00010
DOMAIN MI SUBDOMAIN TEC SUBDOMAIN POW SUBDOMAIN POWGEN COLLOCATIONS; A; AF; AGR; CAD; Calor gas; EP; P; acceptor; accident; accumulator; acoustic coupler; actuator; adapter; adaptor; advanced gas-cooled reactor; afterdamp; alternating current; alternator; ambisonics; ammeter; amp; amplification; amplifier; analogue-to-digital converter; anode; anthracite; antinuclear; armature; audio; audiometer; bank; barrel; battery; bayonet; bell; bezel; binaural; biological shield; bipolar; bipolarity; blackout; bleep; blip; bloop; blow-out; blow; boiler; booster; bore; borehole; bowser; brakeman; brakesman; brazier; breadboard; break; breed; breeder reactor; bridge; briquet; briquette; bromine; brush; bulb; bunker; burn-up; butane; button cell battery; button cell; buzzer; bypass; cable; cage; candle; capacitor; capstan; ceramic stratus; chemical laser; codec; coder/decoder; cut-out; cut; damp; damper; deck; derrick; diaphragm; diesel; diffuser; disc; discharge; dross; earth; electro; element; envelope; excitant; exciter; excitor; fantail; feedback; feeder; fender; fidelity; filament; filter; fireman; flasher; flashlight; flip side; flip-flop; fuel; fuse; gain; gap; gas; gate; geyser; kieselguhr; oiler; outage; paraffin . . .
<CAT ID=00020>
<BRANCH><DOM>MI<SUBDOM>TEC<SUBDOM>OPT <SUBDOM>OPTGEN</BRANCH><COLLS>; Betacam; Betamax; Brownie; Calotype; Overcoat; PAL; aberration; achromat; achromatic; adaptive optics; aliasing; amplifier; anaglyph; anamorphic lens; aperture synthesis; aperture; apochromat; aspect ratio; atomic force microscope; autofocus; automatic exposure; autotype; b/w; back projection; bath; bayonet; bellows; bifocal; binocular; black and white; blimp; blow-up; blue-backing shot; box camera; bromide paper; bromine; bromoil; bull's-eye; camcorder; camera lucida; camera obscura; camera; carbro; color cinematography; color negative; colorization; colour cinematography; colour negative; conforming; coronagraph; couplers; daguerreotype; develop; developer; diaphragm; dolly; emulsion; exposure; film; filter; fix; fixer; flash; flashlight; flood; fog; frame; freezeframe; gauge; ghost; meniscus; microdot; mil; monitor; mount; negative; nosepiece; objective; ocular; opaque; pan . . .

What is claimed is:

1. A computer processing apparatus for classifying a document, comprising:

a database having a database structure providing a classification scheme having a plurality of different subject matter categories, the database containing a classified vocabulary including a plurality of terms in each of the different subject matter categories with each term being classified in accordance with the classification scheme and the database also containing a classification data set comprising a plurality of groups of terms with each group being associated with a specific different one of the subject matter categories and each group including a plurality of terms exemplifying the associated category for facilitating disambiguation between different meanings of the same term;

means for receiving in computer-readable form a document to be classified;

processor means for comparing terms appearing in the text document with the terms in the database and for determining from the comparison the category for the document; and means for supplying a signal carrying data representing the document and data associating the document with the determined category.

2. The apparatus according to claim 1, wherein the processor means determines the category for the document by determining from the comparison the category or categories of terms in the document, assigns weightings to the determined categories for the terms, and assigns the document being classified to the category having the highest weighting.

3. The apparatus according to claim 2, wherein the processor means shares, for each term in the classified vocabulary and in the text document, a predetermined weighting factor between each category associated with the term.

4. The apparatus according to claim 1, further comprising means for storing the database.

5. The apparatus according to claim 1, wherein the database provides said plurality of subject matter categories as a tree structure including a plurality of main subject matter areas each divided into two or more subject matter areas.

6. The apparatus according to claim 1, wherein the database provides said plurality of subject matter categories such that each category is defined by a subject matter area and a species or genus.

7. The apparatus according to claim 6, wherein the database provides said plurality of subject matter categories such that the species or geni are people, places, organisations, products and technology.

8. The apparatus according to claim 6, wherein the database provides said plurality of subject matter categories such that the species or geni are the same for each subject matter area.

9. The apparatus according to claim 1, wherein the database provides categories in each of the following subject matter areas: the universe, the earth, the environment, natural history, humanity, recreation, society, the mind and human history.

10. The apparatus according to claim 6, wherein the database is such that, for a given meaning, a term is associated with only one category and different meanings of the same term are associated with different categories.

11. The apparatus according to claim 1, wherein the supplying means comprises means for storing a signal supplied by the supplying means on a computer readable medium.

12. The apparatus according to claim 1, wherein the supplying means comprises means for forwarding a signal supplied by the supplying means to another processing apparatus.

13. The apparatus according to claim 1, wherein the supplying means comprises means for displaying the information to a user.

14. A database for use with an apparatus in accordance with claim 1, the database having a database structure providing a classification scheme having a plurality of different subject matter categories, the database containing a classified vocabulary including a plurality of terms in each of the different subject matter categories with each term being classified in accordance with the classification scheme and the database also containing a classification data set comprising a plurality of groups of terms with each group being associated with a specific different one of the subject matter categories and each group including a plurality of terms exemplifying the associated category whereby the classification data set facilitates disambiguation between different meanings of the same term.

15. A signal carrying a database in accordance with claim 14.

16. A storage medium carrying a database in accordance with claim 14.

17. A signal carrying processor implementable instructions for causing apparatus to become configured to form apparatus in accordance with claim 1.

18. A computer processing apparatus for classifying a document, comprising:

means for accessing a database having a database structure providing a plurality of different subject matter categories, the database containing a classified vocabulary including a plurality of terms in each of the different subject matter categories with each term being classified in accordance with the subject matter category structure of the database and the database also containing a plurality of collocations each collocation being associated with a specific different one of the subject matter categories and each collocation including a plurality of terms exemplifying the associated category for disambiguating a different meaning of the same term;

means for receiving in computer-readable form a text document to be classified;

processor means for comparing terms appearing in the text document with the collocations to determine the collocation having the most terms in common with the document, and for allocating the category of the determined collocation to the document; and means for supplying a signal carrying data representing the text document and data associating the text document with the determined category.

19. The apparatus according to claim 18, wherein the processor means disambiguates between different meanings of terms by using the collocations.

20. The apparatus according to claim 18, wherein the accessing means accesses the collocations from store means separate from the remainder of the database.

21. A database for use with an apparatus in accordance with claim 18, the database having a database structure providing a classification scheme having a plurality of different subject matter categories, the database containing a classified vocabulary including a plurality of terms in each of the different subject matter categories with each term being classified in accordance with the classification scheme and the database also containing a classification data set comprising a plurality of collocations each collocation being associated with a specific different one of the subject matter categories and each collocation including a plurality of terms exemplifying the associated category whereby the classification data set facilitates disambiguation between different meanings of the same term.

22. A method of classifying documents in a computer processing apparatus, comprising:

providing a database having a database structure providing a classification scheme having a plurality of different subject matter categories, the database containing a classified vocabulary including a plurality of terms in each of the different subject matter categories with each term being classified in accordance with the classification scheme and the database also containing a classification data set comprising a plurality of groups of terms with each group being associated with a specific different one of the subject matter categories and each group including a plurality of terms exemplifying the associated category whereby the classification data set facilitates disambiguation between different meanings of the same term, and a receiver configured to receive in computer-readable form a text document to be classified;

comparing terms appearing in the text document with the terms in the database;

determining from the comparison the category for the text document; and supplying a signal carrying data representing the text document and data associating the text document with the determined category.

23. The method according to claim 22, further comprising determining the category for the document by determining from the comparison the category or categories of the terms in the document, assigning weightings to the determined categories for the terms, and assigning the document being classified to the category having the highest weighting.

24. The method according to claim 23, further comprising assigning weighting by, for each term in the classified vocabulary and in the text document, sharing a predetermined weighting factor between each category associated with the term.

25. The method according to claim 22, further comprising carrying out the supplying by storing a signal on a computer-readable medium.

26. The method according to claim 22, further comprising carrying out the supplying by forwarding a signal to another processing apparatus.

27. The method according to claim 22, further comprising displaying the information to a user.

28. A method of classifying documents in a computer processing apparatus, comprising:

providing a database having a database structure providing a classification scheme having a plurality of different subject matter categories, the database containing a classified vocabulary including a plurality of terms in each of the different subject matter categories with each term being classified in accordance with the classification scheme and the database also containing a classification data set comprising a plurality of collocations of terms with each collocation being associated with a specific different one of the subject matter categories and each collocation including a plurality of terms exemplifying the associated category for disambiguating different meanings of the same term, and a receiver configured to receive in computer-readable form a text document to be classified;

comparing terms appearing in the text document with the collocations to determine the collocation having the most terms in common with the text document;

allocating the category of the determined collocation to the document; and supplying a signal carrying data representing the text document and data associating the text document with the determined category.

29. The method according to claim 28, further comprising accessing the collocations from store means separate from the remainder of the database.

30. A processor readable medium storing processor readable instructions for causing a processor to:

access a database having a database structure providing a classification scheme having a plurality of different subject matter categories, the database containing a classified vocabulary including a plurality of terms in each of the different subject matter categories with each term being classified in accordance with the classification scheme and the database also containing a classification data set comprising a plurality of groups of terms with each group being associated with a specific different one of the subject matter categories and each group including a plurality of terms exemplifying the associated category for facilitating disambiguation of different meanings of the same term;

receive in computer-readable form a text document to be classified;

compare terms appearing in the text document with the terms in the database;

determine from the comparison the category for the document; and supply a signal carrying data representing the text document and data associating the text document with the determined category.

31. A computer processing apparatus for classifying documents, the apparatus comprising:

a database having a database structure defining a classification scheme for terms;

the classification scheme having subject matter data defining main and subsidiary subject matter domains into which terms can be classified and genera data defining a predetermined number of genera to which terms can be allocated, the classification scheme being such that a term can be allocated to more than one subject matter domain but to only one genus so that each specific combination of subsidiary subject matter domain and genus defines a unique category;

the database also having classified vocabulary comprising a set of terms classified in accordance with the classification scheme such that each term is associated with category data identifying the corresponding category;

the database also including a classification scheme data set which includes a respective different classification scheme data set item associated with each category;

each classification scheme data set item comprising a collocation consisting of a list of terms that may be used to describe the function, appearance or relationship with other objects of classified terms in that category or that may be used in relation to terms in that category;

a receiver operable to receive in computer-readable form a text document to be classified;

a processor configured to compare terms in the text document with terms in at least one of the classified vocabulary and the collocations to determine a category for the text document; and a signal supplier configured to supply a signal carrying data representing the text document and data associating the text document with the determined category data.

32. A method of classifying documents, the method comprising:

providing a classification scheme having subject matter data defining main and subsidiary subject matter domains into which terms can be classified and genera data defining a predetermined number of genera to which terms can be allocated, the classification scheme being such that a term can be allocated to more than one subject matter domain but to only one genus so that each specific combination of subsidiary subject matter domain and genus defines a unique category;

providing a classified vocabulary comprising a set of terms classified in accordance with the classification scheme such that each term in the classified vocabulary is associated with category data identifying the corresponding category;

providing a classification scheme data set which includes a respective different classification scheme data set item associated with each category with each classification scheme data set item comprising a collocation consisting of a list of terms that may be used to describe the function, appearance or relationship with other objects of classified terms in that category or that may be used in relation to terms in that category;

receiving data representing a text document to be classified; and comparing terms in the text document with terms in at least one of the classified vocabulary and the collocations to determine a category for the text document.

33. A computer processing apparatus for classifying documents, the apparatus comprising:

a database having a database structure providing a classification scheme having a plurality of different subject matter categories, the database containing a classified vocabulary consisting of a plurality of terms in each of the different subject matter categories with each term being classified in accordance with the classification scheme and the database also containing a classification data set comprising a plurality of groups of terms with each group being associated with a specific different one of the subject matter categories and each group including terms that may be used to describe the function, appearance or relationship with other objects of classified terms in that category or that may be used in relation to terms in that category to facilitate disambiguation between different meanings of the same term;

a receiver configured to receive in computer-readable form a text document to be classified;

a processor configured to use the groups of terms in the classification data set to disambiguate different meanings of terms in the document and to determine a category for the text document using the database; and a signal supplier configured to supply a signal carrying data representing the text document and data associating the text document with the determined category data.

* * * * *